(12) United States Patent
Monahan et al.

(10) Patent No.: US 6,481,548 B2
(45) Date of Patent: Nov. 19, 2002

(54) TWO-WAY CLUTCH WITH LIMITED SLIP FEATURE

(75) Inventors: Russell E. Monahan, Ann Arbor, MI (US); Shiro Goto, Ann Arbor, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/915,123

(22) Filed: Jul. 25, 2001

(65) Prior Publication Data

US 2002/0020596 A1 Feb. 21, 2002

Related U.S. Application Data

(60) Provisional application No. 60/223,744, filed on Aug. 8, 2000.

(51) Int. Cl.[7] .......................... F16D 11/00; F16D 13/00; F16D 23/00
(52) U.S. Cl. .......................... 192/38; 192/35; 192/48.3; 180/249
(58) Field of Search .............................. 192/35, 38, 40, 192/48.3, 52.5, 70.23, 84.7, 48.92; 180/249, 247

(56) References Cited

U.S. PATENT DOCUMENTS

| | | | | |
|---|---|---|---|---|
| 4,184,575 A | * | 1/1980 | Fogelberg | 180/253 |
| 4,848,507 A | * | 7/1989 | Masuda et al. | 180/248 |
| 4,883,152 A | * | 11/1989 | Froment | 192/41 R |
| 5,924,510 A | | 7/1999 | Itoh et al. | |
| 5,927,456 A | | 7/1999 | Mohahan et al. | |
| 5,967,276 A | * | 10/1999 | Leichliter et al. | 192/35 |
| 6,041,879 A | * | 3/2000 | Itoh et al. | 180/247 |
| 6,062,361 A | * | 5/2000 | Showalter | 192/35 |
| 6,098,770 A | * | 8/2000 | Isley, Jr. | 192/35 |
| 6,343,681 B1 | * | 2/2002 | Aoki | 192/35 |

* cited by examiner

Primary Examiner—Rodney H. Bonck
Assistant Examiner—Eric M. Williams
(74) Attorney, Agent, or Firm—Brinks Hofer Gilson & Lione

(57) ABSTRACT

A two-way clutch for allowing limited torque to be transferred until a roller clutch mechanism is forced to an engaged position. The present invention includes a roller clutch, with a torque generating device mounted thereon, including an actuator for producing an axial force onto a clutch pack. A torque transfer device is disposed between the torque generating device and the roller clutch. The torque transfer device is adapted to receive torque from the torque generating device and to transfer torque to the roller clutch. When a predetermined level of torque is produced by the torque generating device, the torque transfer device moves the roller clutch into an engaged position.

12 Claims, 3 Drawing Sheets

TWO-WAY CLUTCH WITH LIMITED SLIP FEATURE

CROSS REFERENCE TO RELATED APPLICATIONS

This application claims the benefit of related provisional application Serial No. 60/223,744 filed Aug. 8, 2000.

TECHNICAL FIELD OF THE INVENTION

The present invention relates to an arrangement for providing engagement for a frictional clutch assembly. More specifically, the present invention relates to a limited slip feature for a clutch assembly of a roller/ramp variety which provides limited torque transfer until the clutch assembly is engaged.

BACKGROUND OF THE INVENTION

Often, components of a system require selective engagement. Two such systems which are used in automotive applications are differential assemblies and transfer cases.

Differential assemblies are used in motor vehicles to allow the wheels to turn at different rotational speeds while still providing power to the wheels. Various types of differential assemblies are used in motor vehicles to redirect the transfer of power to the driving axles.

A limited slip differential assembly is a type of differential assembly which can be selectively engaged to provide positive traction to the wheels. A limited slip differential assembly typically uses clutch pads to link a differential housing to one or both side gears which results in a limited amount of torque being sent to a non-spinning wheel. Unfortunately, limited slip differentials typically have low torque capacity which, during certain high power operating conditions, can result in insufficient power being transmitted through the differential assembly. In these cases, wear of the clutch pads may occur, which adversely affects the performance of the differential assembly.

Another differential assembly design that is used to overcome the shortcomings of the standard differential assembly is known as the locking differential. A locking differential typically engages a "dog" clutch or an axial gear set to lock the two axle halves together. Unfortunately, locking differentials cannot be engaged "on-the-fly" because any relative motion between the gear teeth would result in severe mechanical damage.

A transfer case is another type of automotive application that may require selective engagement of certain system components. A part-time transfer case is a device which can selectively provide power to the alternate drive wheels in a four-wheel drive vehicle. Various types of part-time transfer cases are known. Unfortunately, due to the rigorous operating conditions that part-time transfer cases are exposed to, wear often occurs in the components, resulting in a decreased level of performance in the system.

It is known in the art to selectively lock various drivetrain components using roller/ramp clutch assemblies. For example, the two-way over-running clutch assembly described in U.S. Pat. No. 5,927,456, assigned to NTN Corporation, and hereby incorporated by reference, describes a clutch assembly of a roller ramp variety and the mechanism by which the rollers are retained and biased in the assembly. In addition, the rotation transmission device described in U.S. Pat. No. 5,924,510, also assigned to NTN Corporation, and hereby incorporated by reference, describes a device which includes a clutch assembly mounted in the transfer case of a four-wheel drive vehicle that can selectively transmit a driving force. These roller clutch mechanisms, however, often provide for a hard engagement between system components, which may increase wear and decrease performance.

It would be desirable to provide an arrangement which can be used in various applications and includes the advantages of roller clutch mechanism while providing for softer engagement of components or which can be used to delay engagement of components until absolutely necessary. It would be particularly desirable to provide this technology for use with differential assemblies or transfer cases.

A primary object of this invention is therefore to provide a two-way over-running clutch mechanism installed in a system which when energized will provide a limited torque transfer before locking together an input mechanism and output mechanism. This arrangement will provide decreased wear on the components of the system, thereby improving its performance and increasing its service life.

SUMMARY OF THE INVENTION

Briefly described, these and other objects are accomplished according to the present invention by providing an arrangement for allowing limited torque to be transferred until a roller clutch mechanism is forced to an engaged position. The present invention includes a roller clutch. A torque generating device is mounted to the roller clutch and includes an actuator for producing an axial force onto a clutch pack. A torque transfer device is disposed between the torque generating device and the roller clutch. The torque transfer device is adapted to receive torque from the torque generating device and to transfer torque to the roller clutch. When a predetermined level of torque is produced by the torque generating device, the torque transfer device moves the roller clutch into an engaged position.

DETAILED DESCRIPTION OF THE PREFERRED EMBODIMENTS

The following description of the three preferred embodiments of the invention is not intended to limit the scope of the invention to these preferred embodiments, but rather to enable any person skilled in the art to make and use the invention.

Figure 1:
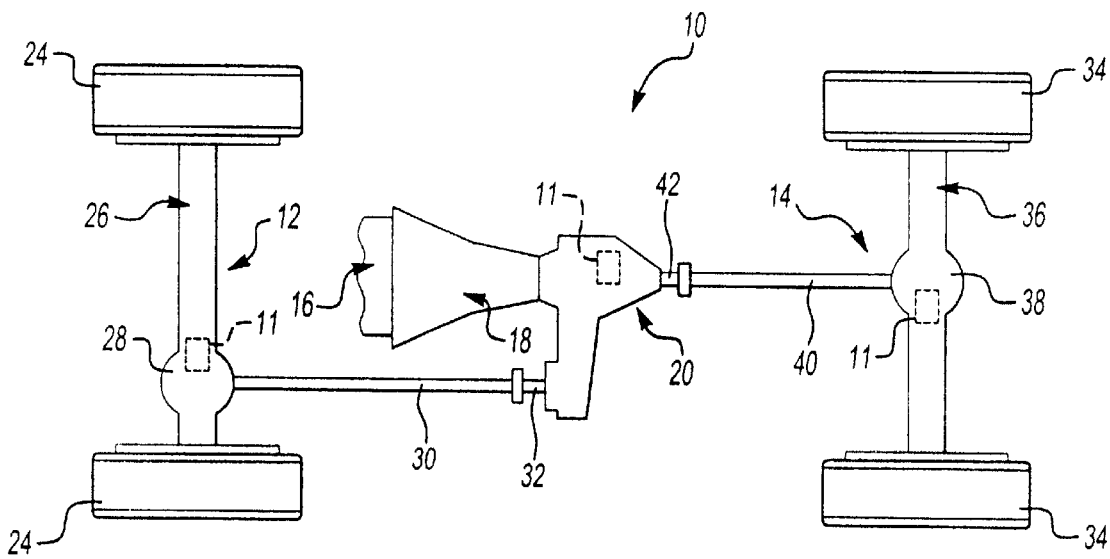
FIG. 1 is a plan view of a drivetrain of a typical four-wheel drive vehicle which has components equipped with a clutch of the preferred embodiment of the present invention.

Referring to FIG. 1 a drivetrain for a four-wheel drive vehicle including components according to the principles of the present invention is shown generally at 10. Specifically, the drivetrain 10 incorporates three two-way clutches 11 of the present invention and includes a front driveline 12 and a rear driveline 14 both drivable from a source of power, such as an engine 16, through a transmission 18 which may be of the manual, automatic, or continuously variable type. The drivetrain 10 includes a transfer case 20 for transmitting drive torque from the engine 16 and the transmission 18 to the front driveline 12 and the rear driveline 14. The front driveline 12 includes a pair of front wheels 24 connected at opposite ends of a front axle assembly 26 having a front differential 28 that is coupled to one end of a propshaft 30, the opposite end of which is coupled to a front output shaft 32 of the transfer case 20. Similarly, the rear driveline 14 includes a pair of rear wheels 34 connected at opposite ends of a rear axle assembly 36 having a differential 38 coupled to one end of a rear propshaft 40, the opposite end of which is interconnected to a rear output shaft 42 of the transfer case 20. While illustrated in connection with the differential assemblies 28 and 38 and transfer case 20, it is to be understood that the clutch 11 of the present invention has applicability to any mechanical system which includes a roller clutch mechanism. Some examples of potential applications include, but are not limited to, conveyor line drive systems, where articles are driven along or allowed to slide freely down the conveyor line, and paper feed mechanisms for copiers and printers.

Since differential assemblies and transfer cases are well known in their construction and since the details of them are not necessary to a proper understanding of the present invention, they are not described in greater detail herein. Rather, the discussion will focus on those aspects of the present invention which would be commonly employed, regardless of the particular application.

The two-way clutch 11 of the present invention includes a roller clutch mechanism. The roller clutch mechanism is preferably of the type described in U.S. Pat. No. 5,927,456 and U.S. Pat. No. 5,924,510, both assigned to NTN Corporation. These roller clutch mechanism use an inner race and an outer race which can wedge a plurality of rollers into an engaged position.

Figure 2:
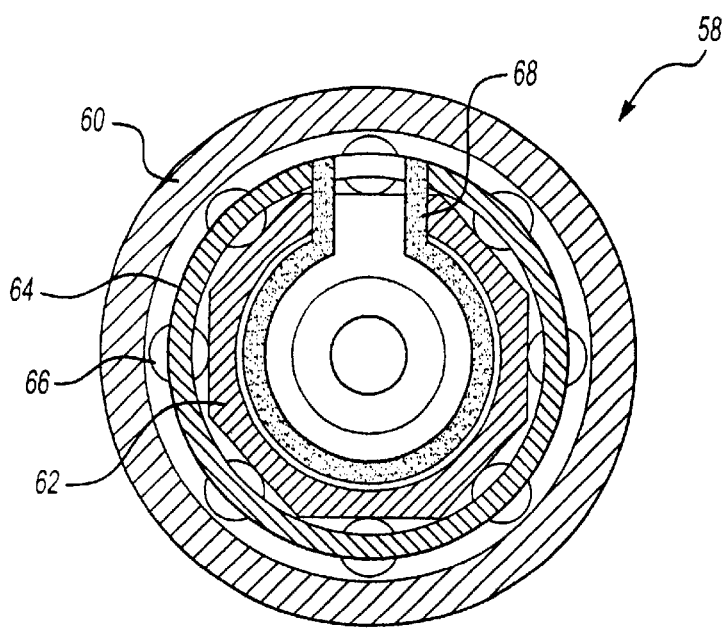
FIG. 2 is a cross-sectional end view of a first preferred embodiment of a two-way clutch of the present invention.

Referring to FIG. 2, a roller clutch mechanism 58 as described in U.S. Pat. No. 5,927,456 is shown. The clutch mechanism 58 includes an outer race 60, an inner race 62, a retainer 64, a plurality of rollers 66, and a return spring 68.

Figure 3:
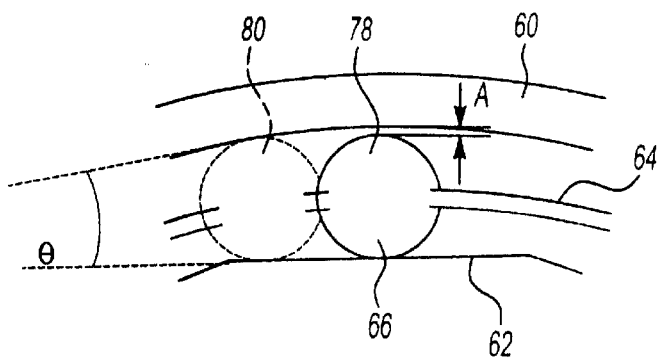
FIG. 3 is a partial end view of the two-way clutch shown in FIG. 2.

Referring to FIG. 3, the clutch mechanism 58 is shown with a roller 66 in a disengaged or neutral position, as shown by reference numeral 78, and an engaged position as shown in phantom by reference numeral 80. The outer race 60 has a cylindrically shaped inner surface, and the inner race 62 has an outer surface defined by a plurality of cammed surfaces. In the disengaged state 78, one of the rollers 66 are held centrally within each of the cammed surfaces by the retainer 64. The distance between centers of the cammed surfaces of the inner race 62 and the inside surface of the cylindrical outer race 60 is greater than the diameter of each of the rollers 66, thereby leaving a gap designated as "A", so that the rollers 66 cannot contact both of the surfaces at the same time when the rollers 66 are held at the centers of the cammed surfaces.

The retainer 64 is held in position with respect to the cammed inner race 62 by the return spring 68 (shown in FIG. 2), such that each of the rollers 66 is held at the center of one of the cammed surfaces. If sufficient torque is applied, the centering force of the centering spring can be overcome allowing the retainer 64 to force the rollers 66 to move across the cammed surfaces of the inner race 62 until the rollers 66 become wedged in the angle Ø described by the tangent of the cylindrical outer race 60 and the cammed surfaces of the inner race 62.

Since roller type mechanisms are well known in their construction and since the details of the preferred types may be found in the incorporated references, they are not described in greater detail herein. Rather, the discussion will focus on those aspects of the present invention which would be commonly employed, regardless of the particular application.

Figure 4:
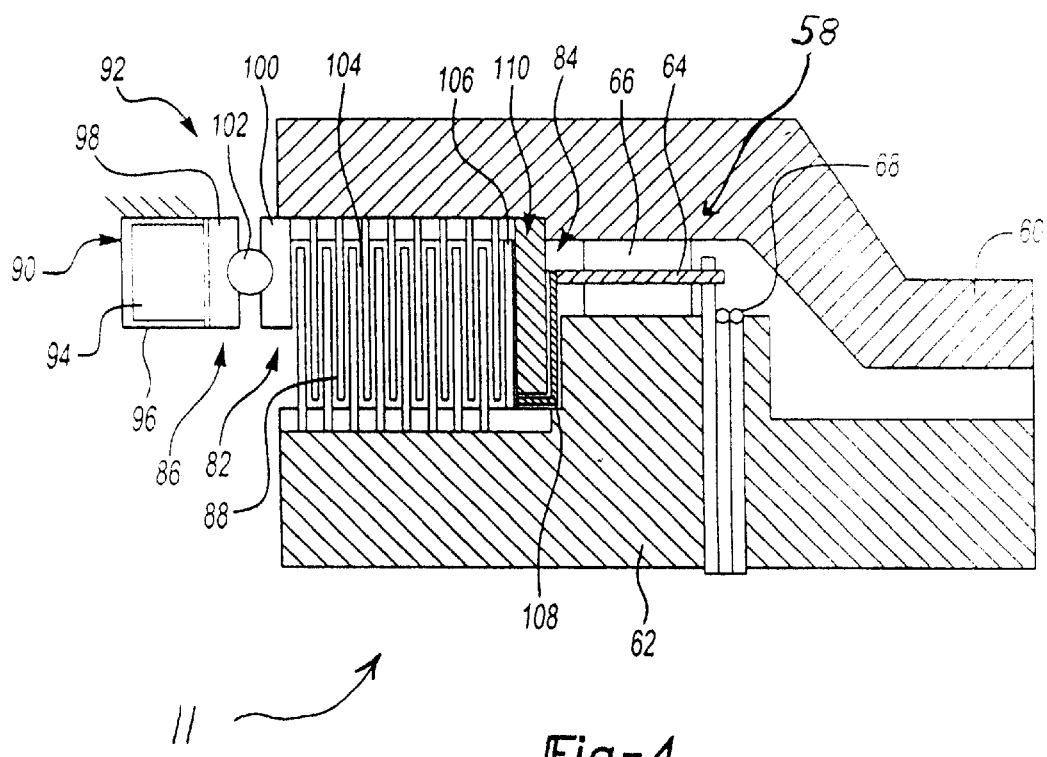
FIG. 4 is a cross-sectional side view of the top half of the first preferred embodiment.

Referring to FIG. 4, a first preferred embodiment of the two-way clutch of the present invention is shown generally at 11. The first preferred embodiment 11 includes a roller clutch mechanism 58 as shown in FIGS. 2 and 3. The two-way clutch 11 further includes a torque generating device 82 and a torque transfer device 84.

The torque generating device 82 is coupled to the roller clutch mechanism 58 and includes an actuator 86 and a clutch pack 88. The actuator is adapted to produce and transmit an axial force onto the clutch pack 88.

The torque generating device 82 further includes a ball ramp device 92 which is disposed between the actuator 86 and the clutch pack 88. Preferably, the actuator 86 comprises an electromagnetic coil assembly 90, however, it is to be understood that other actuation mechanisms may be used, such as a centrifugal flyweight mechanism that provides an axial force at high rotational speeds or a gerotor pump which could pump fluid proportionally to provide hydraulic axial pressure, to achieve the same goals.

As shown, the electromagnetic coil assembly 90 includes a coil 94 and a surrounding stator 96. An electronic control unit, or ECU, (not shown) is preferably used to send a signal to the coil 94 when appropriate. When a predetermined parameter, such as a sensed velocity differential or sensed slip, is reached, the electromagnetic coil 94 is actuated by the ECU. This actuation by the ECU can be controlled and modulated by either limiting the current delivered to the coil 94 or by pulsewidth modulation of the output signal.

The ball-ramp device 92 is of the type that is well known in the art and is reactive to the actuation of the electromagnetic coil assembly 90. As shown, the ball-ramp device 92 includes a first half 98, a second half 100, and a plurality of balls 102 (only one shown) disposed therebetween. The ball-ramp device 92 normally rotates with the outer race 60 of the roller clutch mechanism 58 as shown, however, it is to be understood by one of ordinary skill in the art that the ball-ramp device 92 could alternatively rotate with the inner race 62 of the roller clutch mechanism 58. As the electromagnetic coil 94 is partially actuated through current control or pulsewidth modulation of the electrical signal to the coil 94, the first half 98 of the ball-ramp device 92 is drawn toward the coil 94. The first half 98 of the ball ramp device 92 will eventually contact the stator 96 which is stationary and surrounds the coil 94. The friction between the first half 98 of the ball ramp device 92 and the stator 96 slows down the rotation of the first half 98, thereby causing the two halves 98,100 of the ball-ramp device 92 to rotate relative to each other. Each half 98, 100 of the ball-ramp device 92 includes an axial raceway (not shown) for seating the balls 102. The raceways are shaped like "ramps" such that when the balls 102 in between the two raceways roll up the respective ramps, an axial displacement of the two halves 98, 100 relative to each other results. When the two halves 98, 100 rotate at different rotational speeds, the balls are consequently forced to roll along the ramps within the raceways, thereby forcing the two halves 98, 100 further apart.

The clutch pack 88 is adapted to receive the axial force generated when the two halves 98, 100 of the ball ramp device 92 are forced apart. The clutch pack 88 is located between the outer race 60 and inner race 62 of the roller clutch mechanism 58 and includes a plurality of standard clutch plates 104. Approximately half of the clutch plates 104 are splined to the outer race 60 and the rest are splined to the inner race 62. As the axial force transferred from the ball ramp device 92 to the clutch plates 104 increases, the clutch plates 104 which are splined to the inner race 62 are forced into contact with the clutch plates 104 which are splined to the outer race 60. Friction between the plates 104 transfers torque between the inner race 62 and the outer race 60. The amount of torque that is transferred is proportional to the axial force provided by the ball-ramp device 92 which is controlled by the amount of current that is supplied to the electromagnetic coil 94.

The two-way clutch 11 further includes a torque transfer mechanism 84. In the first preferred embodiment 11, the torque transfer mechanism 84 includes a floating clutch plate 106 and a retainer link 108 connected to the retainer 64 of the roller clutch mechanism 58. A backing pressure plate 110 is splined to the outer race 60 of the roller clutch mechanism 58 between the clutch pack 88 and the roller clutch mechanism 58. Alternatively, the backing pressure plate 110 could be splined to the inner race 62. The backing pressure plate 110 acts as a backstop for the axial forces induced during actuation of the clutch pack 88. The floating clutch plate 106 is located between the last standard clutch plate 104 and the backing pressure plate 110. This extra clutch plate 106 is not splined to the inner race 62 or outer race 60, but instead floats loosely on the inner race 62 and inside the outer race 60 and is rotationally connected to the retainer link 108.

Because the subsequent axial force delivered by the combination of the coil 94 and ball-ramp device 92 can be controlled, modulation of the amount of torque delivered through the clutch pack 88 can be accomplished. As the ECU senses that a predetermined parameter has been met, such as the amount of slip between the right and left wheels in the differential application and between the front and rear wheels in the transfer case application, the coil 94 is energized. When the friction between the floating clutch plate 106 and the backing pressure plate 110 is high enough, the floating clutch plate 106 will begin to rotate with the outer race 60, thereby causing rotational movement of the retainer link 108, which in turn will cause rotation of the retainer 64.

When the torque on the floating clutch plate 106 is sufficient to overcome the resisting torque of the torsional return spring 68, the retainer 64 will rotate relative to the cammed surface, thereby moving the rollers 66 into their engaged positions between the cammed and smooth surfaces of the roller clutch mechanism 58. Thus, the roller clutch mechanism 58 locks. This engagement point can be controlled by a number of parameters, including the torsional stiffness of the return spring 68 and the coefficient of friction between the floating clutch plate 106 and both the last standard clutch plate 104 and the backing pressure plate 110.

Figure 5:
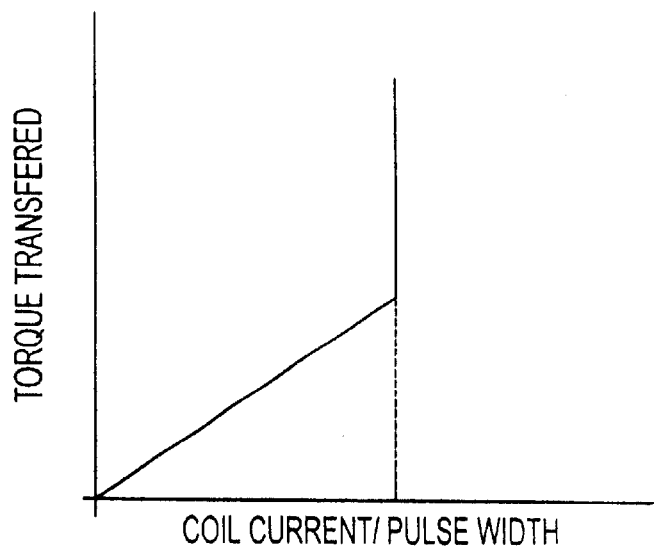
FIG. 5 is a graph showing the relationship between coil current/pulsewidth and torque transferred by the two-way clutch of the present invention.

Referring to FIG. 5, the relationship of coil current/pulsewidth to torque transferred is illustrated. From zero current or pulsewidth of the ECU's coil actuation signal to the engagement level necessary to actuate the roller clutch 58, the two-way clutch 11 will transfer torque proportional to current or pulsewidth. The torque is maximized at the current or pulsewidth at which the return spring 68 is overcome, and the roller clutch 58 locks up.

Figure 6:
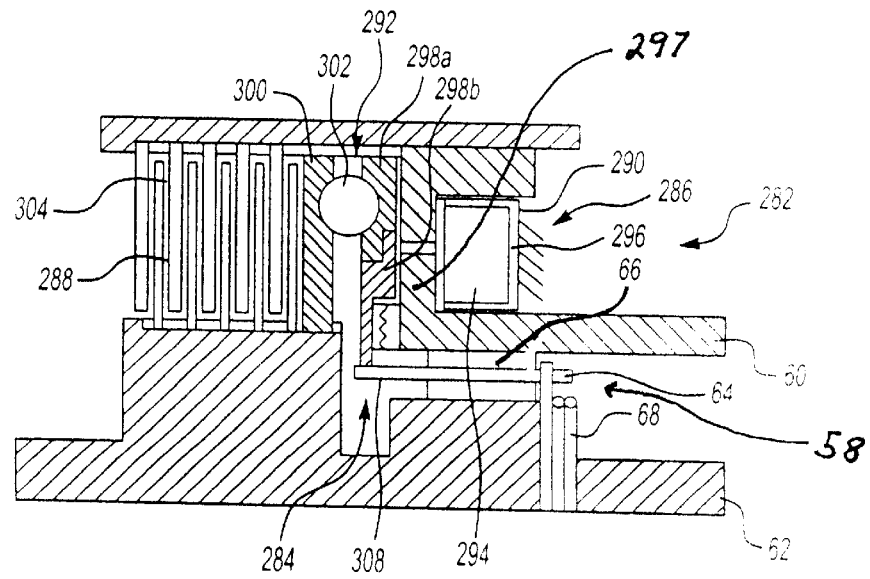
FIG. 6 is a cross-sectional side view of a top half of the second preferred embodiment of the two-way clutch of the present invention.

Referring to FIG. 6, a second preferred embodiment is shown generally at 211, wherein, components similar to those described in the first preferred embodiment 11 have been incremented by 200. The second preferred embodiment 211 includes similar components, with similar functions, as the first preferred embodiment 11, except as discussed below. The second preferred embodiment 211, as shown, includes the roller clutch mechanism 58 described in FIGS. 2 and 3. The arrangement further includes a torque generating device 282 and a torque transfer device 284.

The torque generating device 282 is coupled to the roller clutch mechanism 58 and includes an actuator 286 and a clutch pack 288. The actuator 286 is adapted to produce and transmit an axial force onto the clutch pack 288. The torque generating device 282 further includes a ball ramp device 292 which is disposed between the actuator 286 and the clutch pack 288. Preferably, the actuator 286 comprises an electromagnetic coil assembly 290. As shown, the electromagnetic coil assembly 290 includes a coil 294, a housing, and a secondary stator 297, which is combined with the outer race 60. An electronic control unit, or ECU, (not shown) is preferably used to send a modulated current signal to the coil 294 when appropriate. When a predetermined parameter is reached, the electromagnetic coil 294 is actuated by the ECU.

The ball-ramp device 292 is of the type that is well known in the art and is reactive to the actuation of the electromagnetic coil assembly 290. As shown, the ball-ramp device 292 includes a first portion of a split armature 298a, a second half 300, and a plurality of balls 302 (only one shown) disposed therebetween. The ball-ramp device 292 normally rotates with the inner race 62 of the roller clutch mechanism 58 as shown.

The amount of frictional torque generated between the first portion of the split armature 298a and the stator 297 surrounding the housing 296 around the stationary coil 294 is proportional to the current supplied to the coil 294. At low currents, the frictional torque is low, and the first portion of the split armature 298a rotates slightly and forces the ball-ramp device 292 to start actuating. As friction is generated between the stator 297 and the first portion of the split armature 298a, the ball-ramp device 292 is partially engaged, producing an axial force.

The clutch pack 288 is adapted to receive the axial force from the ball-ramp device 292. The clutch pack 288 includes a plurality of standard clutch plates 304. Approximately half of the standard clutch plates 304 are splined to the inner race 62 and the remaining standard clutch plates 304 are splined to the outer race 60. Friction between the plates 304 transfers torque that is proportional to the axial force provided by the second half 300 of the ball-ramp device 292.

The two-way clutch 211 also includes a torque transfer mechanism 284 including a second portion of the split armature 298b and a retainer link 308 connected to the retainer 64 of the roller clutch mechanism 58.

As the current to the coil 294 is increased, more axial force is generated in the clutch pack 288, transferring proportionally more torque. During this intermediate torque operation, the two portions of the split armature 298a and 298b rotate relative to each other, with the first portion 298a actuating the ball-ramp device 292 and the second portion 298b being held in place by the return spring 68 of the roller clutch mechanism 58 and rotating with the cammed inner race 62. The torque generated is insufficient to overcome the return spring 68, so the retainer 64 and rollers 66 remain in their neutral, disengaged positions.

Because the subsequent axial force delivered by the combination of the coil 294 and ball-ramp device 292 can be controlled, modulation of the amount of torque delivered through the clutch pack 288 can be accomplished. As the ECU senses that a predetermined parameter has been met, such as the amount of slip between the right and left wheels in the differential application and between the front and rear wheels in the transfer case application, the coil 294 is energized, thereby steadily increasing the frictional force generated between the stator 297 and the split armature 298*a* and *b*. When the friction between the stator 297 and the second portion of the split armature 298*b* is high enough, the second portion of the split armature 298*b* rotates with the stator 297. When the torque is sufficient to overcome the torque of the return spring 68, the second portion of the split armature 298*b* forces the retainer 64 to rotate relative to the cammed surfaces, thus placing the rollers 66 into engaged position. Under these conditions, the inner race 62 and the outer race 60 are locked together, and there is no slip in the clutch plates 288. This engagement point can be controlled by a number of parameters, including the torsional stiffness of the return spring, the coefficient of friction between the clutch plates and the design of the split armature 298*a* and *b*.

As with the first preferred embodiment 11, the effect of the second preferred embodiment 211 will be to transfer torque proportionally between the inner and outer races 60,62 up to a limit at which the locked condition will occur. Therefore, the relationship between coil current and torque transferred is the same as shown in FIG. 5.

Figure 7:
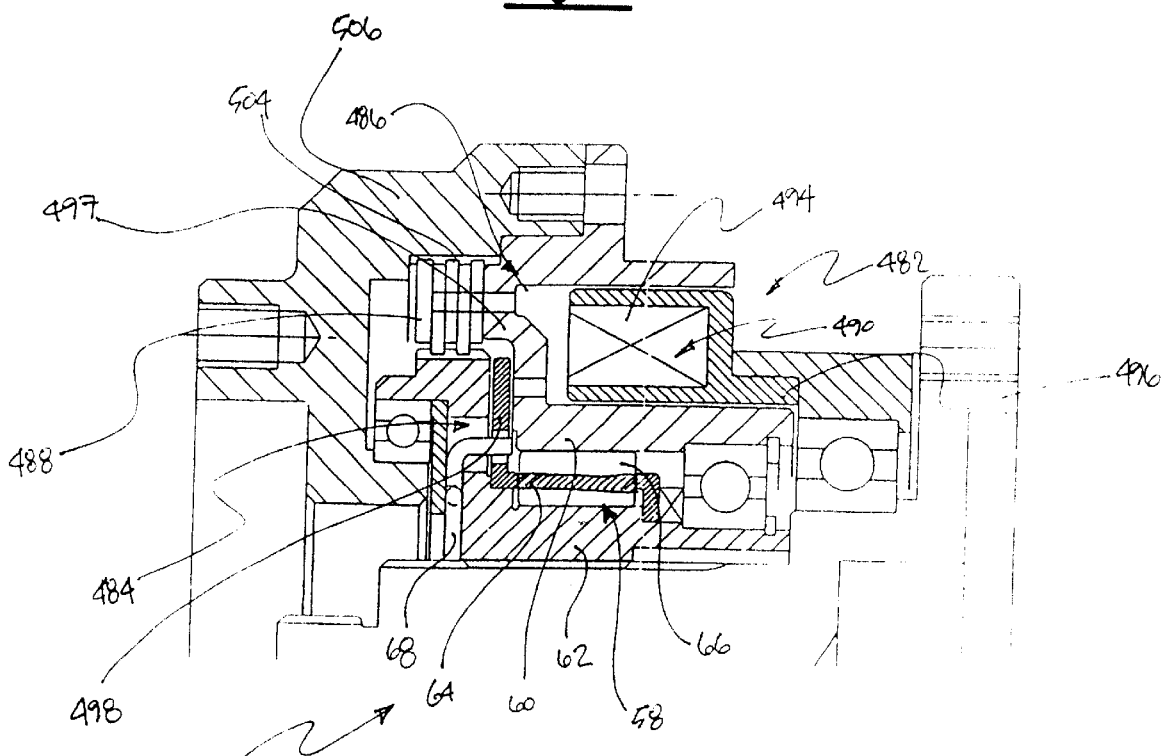
FIG. 7 is a cross-sectional side view of a top half of the third preferred embodiment of the two-way clutch of the present invention.

Referring to FIG. 7, a third preferred embodiment is shown generally at 411, wherein, components similar to those described in the second preferred embodiment 211 have been incremented by another 200. The third preferred embodiment 411 includes similar components, with similar functions, as the first and second preferred embodiments 11 and 211 except as discussed below. The third preferred embodiment 411, as shown, includes the roller clutch mechanism 58 described in FIGS. 2 and 3. The arrangement further includes a torque generating device 482 and a torque transfer device 484.

The torque generating device 482 is coupled to the roller clutch mechanism 58 through the outer race 60 and includes an actuator 486 and a clutch pack 488. The actuator 486 is adapted to produce and transmit an axial force onto the clutch pack 488.

The torque generating device 482 comprises an electromagnetic coil assembly 490. As shown, the electromagnetic coil assembly 490 includes a coil 494 and a housing 496, and a surrounding stator 497, which is combined with the outer race 60. An electronic control unit, or ECU, (not shown) is preferably used to send a modulated current signal to the coil 494 when appropriate. When a predetermined parameter is reached, the electromagnetic coil 494 is actuated by the ECU.

In the second preferred embodiment 211, the clutch pack 288 is engaged by an axial pushing force from the ball-ramp device 292. In the third preferred embodiment 411, however, the clutch pack 488 is drawn into engagement with the stator 497 by the magnetic pull of the actuator 486.

The amount of frictional torque generated within the clutch pack 488 is proportional to the current supplied to the coil 494. At low currents, the frictional torque is low, and the actuator 486 generates friction between the stator 497 and the clutch pack 488.

The clutch pack 488 includes a plurality of standard clutch plates 504. Approximately half of the standard clutch plates 504 are splined to outer race 60 and the remaining standard clutch plates 504 are splined to an output section 506. As the clutch pack 488 is drawn into engagement with the staor 497, the clutch plates 504 are forced into engagement with one another. Friction between the plates 504 transfers torque that is proportional to the magnetic pull provided by the actuator 486.

The torque transfer mechanism 484 includes an armature 498 connected to the retainer 64 of the roller clutch mechanism 58.

Because the subsequent axial force delivered by the combination of the coil 494 and the actuator 482 can be controlled, modulation of the amount of torque delivered through the clutch pack 488 can be accomplished. As the ECU senses that a predetermined parameter has been met, such as the amount of slip between the right and left wheels in the differential application and between the front and rear wheels in the transfer case application, the coil 494 is energized, thereby steadily increasing the frictional force generated between the actuator 486 and the clutch pack 488. When the current supplied to the coil 494 is high enough, the armature 498 is drawn into friction engagement with the stator 497, and rotates with the stator 497. When the torque is sufficient to overcome the torque of the return spring 68, the armature 498 forces the retainer 64 to rotate relative to the cammed surfaces, thus placing the rollers 66 into engaged position. Under these conditions, the inner race 62 and the outer race 60 are locked together, and there is no slip in the clutch plates 488. This engagement point can be controlled by a number of parameters, including the torsional stiffness of the return spring, the coefficient of friction between the armature 498 and the stator 497.

As with the first and second preferred embodiments 11 and 211, the effect of the third preferred embodiment 411 will be to transfer torque proportionally between the inner and outer races 60,62 up to a limit at which the locked condition will occur. Therefore, the relationship between coil current and torque transferred is the same as shown in FIG. 5.

The two-way clutch 11, 211, 411 is capable of delaying the engagement of the roller clutch 58, thereby providing a "soft engagement" through the clutch pack 88, 288 488 before engaging the roller clutch mechanism 58. Each of the embodiments 11, 211, 411 may be used to provide a combination of a limited slip locking differential and a soft engagement transfer case clutch mechanism.

The proposed limited slip locking differential system uses the locking action of the roller clutch mechanism 58 to lock the standard differential assembly thereby providing traction under all circumstances. This system has the effect of locking up the differential assembly forcing both sides of the axle to rotate at the same speed.

While the description is related to automotive applications, particularly four-wheel drive sport utility vehicles, the system may also be used in heavy duty trucks and off-road vehicles, such as ATV's, or any other suitable vehicle.

In differential applications, the arrangement may be packaged within the differential or housing on the side of the differential carrier. Lubrication may be shared between the differential and clutch or they can be separate. The clutch can be a separate module that can be added to a standard open differential providing easy and flexible axle assembly.

The foregoing discussion discloses and describes three preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

We claim:

1. A two-way clutch assembly comprising:
   a roller clutch having an inner race and an outer race;
   a torque generating device including an actuator adapted to produce an axial force and a clutch pack coupled between said inner and outer races and adapted to receive said axial force;
   a torque transfer device adapted to transfer torque from said torque generating device to said roller clutch, wherein at a predetermined level of torque produced by said torque generating device, said torque transfer device causes said roller clutch to engage, thereby preventing relative rotation between said inner and outer races.

2. The clutch assembly of claim 1 wherein said outer race has a cylindrical inner surface and is rotatable about an axis; wherein said inner race has an outer surface coaxial with said cylindrical inner surface and defines a gap therebetween, said inner race being rotatable about said axis with allowable rotational movement relative to said outer race; wherein said roller clutch further includes:
   a plurality of ramp surfaces formed at spaced apart locations on said outer surface, said ramp surfaces defining a plurality of cammed surfaces on said outer surface;
   a plurality of rollers positioned between said outer race and said inner race with one of said rollers being located at a midpoint of each of said cammed surfaces, said rollers having a diameter less than said gap between said cylindrical inner surface and said midpoints of said cammed surfaces;
   a retainer interconnecting all of said rollers and causing said rollers to circumferentially move in unison with one another, said retainer being rotatable about said axis with limited relative rotation with respect to said inner race; and
   a biasing element supported on said retainer to radially bias said retainer so as to hold each of said rollers onto said midpoints of said cammed surfaces; and
   wherein said torque generating device induces said torque transfer device to cause said retainer to overcome said biasing element, thereby moving said rollers along said cammed surfaces to a position where said rollers engage and wedge between said inner and outer races to prevent relative rotation between said inner and outer races.

3. The clutch assembly of claim 1 wherein said torque generating device further includes a ball ramp device disposed between said actuator and said clutch pack, wherein said actuator causes said ball ramp device to exert an axial force onto said clutch pack.

4. The clutch assembly of claim 3 wherein said ball ramp device is rotatably connected to one of said inner race and said outer race.

5. The clutch assembly of claim 4 wherein said ball ramp device includes a first half, a second half and a plurality of balls disposed therebetween, each of said first and second halves including a raceway for seating said balls, wherein said raceways are shaped like ramps such that when said balls roll up said raceways, said first and second halves are axially displaced from each other.

6. The clutch assembly of claim 2 wherein said clutch pack includes a plurality of standard clutch plates, wherein a portion of said standard clutch plates are fixed to said inner race, and the remainder of said standard clutch plates are fixed to said outer race.

7. The clutch assembly of claim 6 wherein said torque transfer device includes a backing pressure plate mounted to one of said inner race and said outer race, a floating clutch plate disposed between said backing pressure plate and a last one of said standard clutch plates and a retainer link adapted to rotationally connect said floating clutch plate to said retainer.

8. The clutch assembly of claim 6 wherein said torque transfer device includes a second portion of a split armature disposed between said torque generating device and said outer race and a retainer link adapted to rotationally connect said second portion to said roller clutch.

9. The clutch assembly of claim 6 wherein a portion of said outer race defines a stator, said stator being positioned between said actuator and said clutch pack, said clutch plates being adapted to be forced into engagement with said stator by said actuator.

10. The clutch assembly of claim 9 wherein said torque transfer device includes an armature connected to said retainer, said armature adapted to be forced into engagement with said stator by said actuator.

11. The clutch assembly of claim 1 wherein said actuator is an electromagnetic coil surrounded by a stator which is mounted stationary relative to said inner and outer races.

12. The clutch assembly of claim 11 further including an electronic control unit adapted to actuate said electromagnetic coil and to control and modulate the current to said electromagnetic coil.

* * * * *